VEHICLE BRAKING SYSTEM

Original Filed Jan. 29, 1969

VEHICLE BRAKING SYSTEM

Original Filed Jan. 29, 1969 4 Sheets-Sheet 3

United States Patent Office

Re. 28,177
Reissued Oct. 1, 1974

28,177

VEHICLE BRAKING SYSTEM

Michael John England, Sutton Coldfield, Derrick Donnell, Coventry, and Eric Charles Hales, Studley, England, assignors to Girling Limited, Tyseley, Birmingham, England Original No. 3,695,731, dated Oct. 3, 1972, Ser. No. 79,245, Oct. 8, 1970, which is a division of abandoned application Ser. No. 795,104, Jan. 29, 1969. Application for reissue Dec. 1, 1972, Ser. No. 311,409
Claims priority, application Great Britain, Feb. 1, 1968, 5,210/68; Mar. 20, 1968, 13,412/68
Int. Cl. B60t *13/14*
U.S. Cl. 303—7 12 Claims

Matter enclosed in heavy brackets [ ] appears in the original patent but forms no part of this reissue specification; matter printed in italics indicates the additions made by reissue.

ABSTRACT OF THE DISCLOSURE

A dual purpose hydraulic accumulator is adapted to store hydraulic fluid and to release a spring to apply vehicle brakes mechanically in the event of loss of hydraulic pressure. A cylindrical cavity in a fixed body member is divided by a free piston into a pressure chamber for hydraulic fluid and a spring chamber, preferably a gas cushion. A second piston exposed to one of these chambers serves to compress the brake spring.

The dual purpose accumulator may be fitted to a trailer having hydraulic brakes and adapted to be hitched to a tractor. A metering valve on the tractor serves to controllably connect the accumulator to the hydraulic actuators. The tractor and trailer lines are releasably interconnected by a quick-release, twin-line, self-sealing hydraulic coupling. The accumulator and brake lines on the trailer are automatically interconnected to apply the trailer brakes hydraulically in the event of trailer breakaway. The accumulator can be charged from a constant volume hydraulic pump utilizing an unloader valve.

RELATED APPLICATION

This application is a division of our application, Ser. No. 795,104, filed Jan. 29, 1969, now abandoned.

The invention relates to vehicle braking systems.

According to one aspect of the invention, a hydraulic accumulator comprises a stressed spring acting mechanically to apply the brakes and a piston and cylinder mechanism adapted by the pressure of pressure medium contained in an accumulator chamber in the cylinder to further stress the spring for relieving the mechanically applied brake force, the pressure in the accumulator chamber acting upon further resilient means, such as a cushion of gas, to provide hydraulic energy for normal operation of the brakes.

According to another aspect of the invention, a dual purpose hydraulic accumulator comprises a fixed body member having a cavity therein divided by a movable partition member into a pressure chamber for the hydraulic fluid to be stored and a spring chamber acting on said movable partition member to hold the hydraulic pressure, a brake spring for mechanically applying brakes of the vehicle and a brake-release piston slidable in said body member and exposed to one of said chambers, said brake-release piston acting on said brake spring to compress the brake spring and so relieve the brakes of mechanical actuation when the pressure chamber is charged with hydraulic fluid.

Preferably the movable partition member comprises a free piston slidable in said cavity.

According to another aspect of the present invention, a vehicle braking system comprises a hydraulic accumulator adapted to mechanically apply brakes of the vehicle when the accumulator pressure falls below a predetermined value and at least one hydraulic actuator for vehicle brakes (preferably the previously mentioned brakes), the accumulator and the actuator having separate lines leading to a metering valve adapted to connect said lines to one another responsively to an applied signal whereby pressure medium from the accumulator is used to operate the actuator.

According to a further aspect of the present invention, a trailer vehicle braking system comprises a pressure accumulator adapted to mechanically apply brakes of the trailer vehicle when the accumulator pressure falls below a predetermined value and at least one pressure medium actuator for brakes of the trailer vehicle, the accumulator and the actuator having separate lines leading to respective coupling heads on the trailer vehicle which are adapted to be coupled to corresponding heads on a tractor vehicle fitted with a metering valve adapted to connect the tractor vehicle coupling heads to one another responsively to an applied signal in order to use pressure medium from the accumulator to operate the actuator.

Preferably said trailer vehicle coupling heads are fited with self-closing valves which automatically close when the trailer vehicle coupling heads become detached from the tractor vehicle coupling heads and a valve arrangement is provided on the trailer vehicle, preferably adjacent the coupling heads, for interconnecting said lines on the trailer vehicle in the event that the coupling heads become detached from one another inadvertently.

The present invention is applicable to a vehicle fitted with a "constant volume" hydraulic pump for operating hydraulic services through "open centre" or "open neutral" valves and provided with an unloader valve connected in series with the valves of the hydraulic services and serving to charge the hydraulic accumulator, the unloader valve being adapted to switch to a pump unloading position after the hydraulic accumulator has been charged to a predetermined pressure by the pump.

The invention is further described, by way of example, with reference to the accompanying drawings in which.

Figure 1:
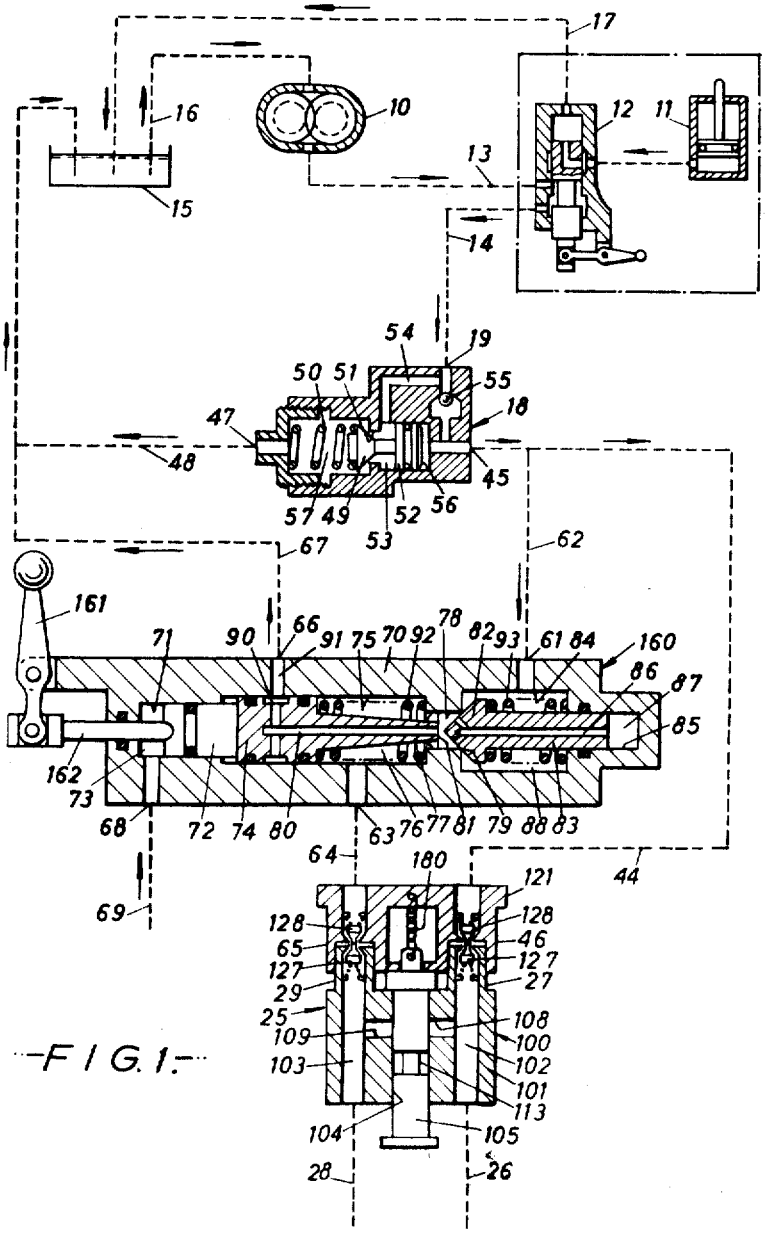
FIG. 1 illustrates that part of a vehicle braking system constructed in accordance with the invention mounted on a tractor.
Figure 2:
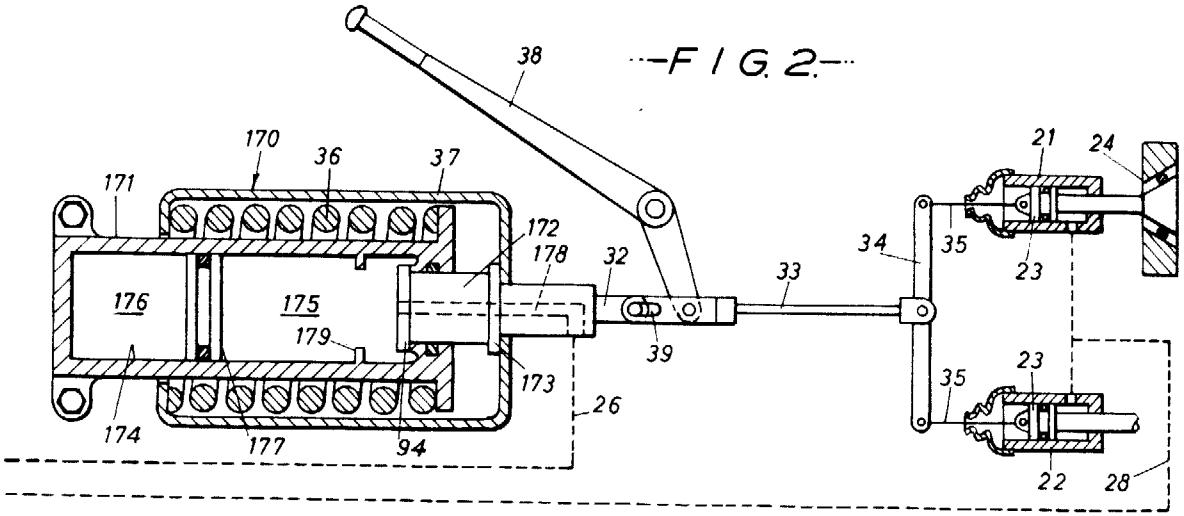
FIG. 2 illustrates that part of the braking system of FIG. 1 mounted on a trailer to be coupled to the tractor.

Referring to FIGS. 1 and 2 of the drawings, a vehicle braking system for a trailer receives its supply of hydraulic fluid from a hydraulic pump 10 fitted to a tractor to which the trailer is intended to be hitched.

The pump 10 serves to provide basic tractor hydraulic services with hydraulic fluid and operates with "constant delivery." A single acting hydraulic cylinder 11 is shown in FIG. 1 by way of example fed from a two-position control valve 12 which has an "open-neutral" position, i.e., in its neutral position it discharges the fluid fed via a line 13 to its inlet port by pump 10 to a line 14. In practice a number of hydraulic services will be provided on the tractor and in most cases these will comprise double acting devices controlled by three-position "open-center" valves. The valves are connected in series in such a way that when one valve in the series is in its "open-center" or "open-neutral" position it passes the fluid fed from the pump 10 to the next valve in the series. In other words the line 14 instead of leading away from the hydraulic services as illustrated would be connected to the inlet port of the next valve in the series. Thus when all the valves are in their "open-center" or "open-neutral" positions the pump 10 discharges directly to the line 14 which conducts the discharged fluid for return to a reservoir 15, from which the pump draws hydraulic fluid through a line 16. When one of the valves, such as the valve 12, is operated, the fluid discharging through the line 14 is throttled to develop the pressure in the line 13 and the fluid delivered by the pump 10 is delivered at this controlled pressure to the hydraulic cylinder 11. The cylinder 11 *is* [in] connected by the valve 12 to a return line 17 leading to the reservoir 15 when the valve 12 is in its neutral position illustrated. Thus the hydraulic system for the tractor services is basically a constant volume system in which the pressure varies according to the demand by the services. However, to operate the trailer brakes a source of hydraulic fluid under constant pressure is required and this source is obtained from the pump 10 by means of an unloader valve 18 whose inlet port 19 is connected to the line 14.

The trailer braking system shown in FIG. 2 comprises a hydraulic accumulator 170 and at least one hydraulic actuator, two such actuators 21 and 22 being illustrated by way of example. The pistons 23 of the actuators operate the brake shoes or brake pads, a cam arrangement 24 for this purpose being shown by way of example. That part of the brake system of the trailer is connected to the part of the system on the tractor by means of a twin, quick-release self-sealing breakaway coupling 25 (FIG. 1). An accumulator line 26 (FIGS. 1 and 2) leads from the trailer coupling head 27 to the accumulator 170 and a brake line 28 leads from the trailer coupling head 29 to the hydraulic actuators 21 and 22.

The hydraulic accumulator 170 is a dual purpose accumulator in that it not only provides a source of hydraulic fluid under pressure for operating the trailer brakes hydraulically but also serves to apply the trailer brakes mechanically in the event of a loss of pressure from the accumulator. The accumulator 170 comprises a fixed body 171 in one end of which a piston 172 is slidable. The rod 32 of the piston 172 is connected by a connecting rod 33 to a yoke 34, the ends of which are connected by brake wires 35 to the individual pistons 23 of the hydraulic actuators 21 and 22. A spring 36 acts between the body 171 and a sleeve 37 which has at one end a flange abutted by a collar 173 on the piston 172. Thus the spring 36 urges the piston 172 to the left in a direction to apply the trailer brakes mechanically and is sufficiently pre-stressed to effect full application of the trailer brakes mechanically. A handbrake lever 38 is coupled to the connecting rod 33 for applying the trailer brakes independently of the spring 36, the connecting rod 33 having a lost motion connection 39 with the piston rod 32 for this purpose. The accumulator body 171 contains a cylindrical cavity 174 which is divided into chambers 175 and 176 by a free piston 177. The chamber 175 serves to store the hydraulic fluid under pressure and is connected via a bore 178 in the piston 172 to the line 26. The chamber 176 is charged through an inlet (not shown) with a gas under a suitable pressure to provide a gas cushion. The gas cushion can be replaced by a compression spring acting between the piston 177 and the left hand end of the body 171.

The accumulator chamber 175 is charged with hydraulic fluid through the unloader valve 18 and a line 44 (FIG. 1) leading from a pressure outlet port 45 of the unloader valve 18 to the tractor coupling head 46 coupled to the trailer coupling head 27. The unloader valve has a discharge port 47 connected by line 48 to the reservoir 15. The unloader valve contains a conical closure member 49 biassed by a spring 50 towards a valve seat 51. The closure member 49 is attached to a piston 52 of slightly larger diameter than the valve seat 51. The valve inlet chamber 53 at the left hand side of the piston 52 is connected by a passage 54 to the inlet port 19. The inlet port 19 is connected through a non-return valve 55 to the pressure outlet port 45. A pressure chamber 56 at the right hand side of the piston 52 is also connected to the pressure port 45. The valve chamber 57, serving as the outlet chamber and accommodating the spring 50, is connected to the discharge port 47.

The unloader valve 18 enables the pump 10, which may for example be a gear pump and which normally operates under constant delivery quantity but variable delivery pressure, to charge the accumulator chamber 175 to a pre-determined pressure.

When the pump 10 is first started up and assuming the none of the basic tractor hydraulic services is operating, i.e., all the valves are in their open-center or open-neutral position, the fluid delivered by the pump flows through the lines 13 and 14 to the inlet port 19 of the valve 18. Initially the spring 50 holds the closure member 49 against its seat 51 so that the hydraulic fluid flows past the non-return valve 55 to the pressure outlet port 45 and through the accumulator lines 44 and 26 to the accumulator chamber 175. The accumulator is shown in FIG. 2 in its charge condition but initially the piston 172 is in its leftward position 177 is in its extreme rightward position in which it abuts a stop 179 in the chamber 175. When the force of the pressure acting on the piston 172 becomes as large as the initial force in the spring 36 the piston 172 is moved to the right thereby simultaneously relieving the trailer brakes of the mechanically applied force. When the pressure of the hydraulic fluid exceeds the pressure to which the gas cushion in the chamber 176 is initially charged the piston 177 moves to the left and balances the pressures in the chambers 175 and 176.

While the non-return valve 55 is open and the accumulator 170 is being charged with hydraulic fluid, the forces of the spring 50 and the pressure in the valve chamber 53 acting over the difference between the areas of the piston 52 and the valve seat 51 hold the closure member 49 closed against its seat 51 against the force of the accumulator pressure acting in the chamber 56 upon the piston 52. When the accumulator pressure reaches a predetermined value determined by the spring 50 and the pressure in the chamber 53, the closure member 49 is moved to the left thereby opening the valve to connect the inlet port 19 to the discharge port 47 which is at reservoir pressure. Once the valve has been cracked open the opening movement is rapid since the pressure in the valve inlet chamber 53 falls but the non-return valve 55 holds the pressure in the biasing chamber 56 at that of the accumulator. In the fully open position, the pressure in the chamber 56 acting on the piston 52 has completely overcome the force of the spring 50. The valve closure member 49 can only close again when the pressure in the accumulator chamber 175 has fallen to a lower pressure at which it can no longer act with sufficient force on the piston 52 to overcome the force of the spring 50. While the closure member 49 is held in its illustrated fully open position by the pressure in the accumulator chamber 175 the line 14 leading from the tractor hydraulic services is freely connected to the reservoir 15 via the unloader valve 18 and the discharge line 48 so that the tractor services can operate in the normal manner. The non-return valve 55 also prevents the accumulator pressure from acting on the tractor hydraulic services.

A metering valve 160 (FIG. 1) is provided on the tractor for the purpose of hydraulically actuating the trailer brakes. The metering valve 160 has an inlet port 61 connected by a branch line 62 to the accumulator line 44, a brake port 63 connected by a line 64 to a tractor coupling head 65 coupled to the coupling head 29, and a discharge port 66 connected by a line 67 to the reservoir 15. The metering valve 160 also has a control port 68 connected by a line 69 to the master brake cylinder (not shown) of the tractor.

The metering valve 160 comprises a body 70 containing a stepped bore. A portion 71 of this bore receives a piston 72 whose left hand face is exposed to a control chamber 73 connected to the control port 68. The piston 72 abuts a second piston 74 which is slidable in a bore portion 75 of slightly larger diameter than the portion 71. The right hand face of the piston 74 bounds a brake pressure chamber 76 connected to the brake port 63. A stem 77 on the piston 74 extends through the pressure chamber 76 and is guided in a reduced diameter portion 78 of the stepped bore. The right hand end of the reduced diameter bore portion 78 provides a first valve seat 79 while the mouth of a longitudinal passage 80 in the stem 77 provides a second valve seat 81 at the free end of the stem 77. A conical valve closure member 82 cooperates with both the valve seats 79 and 81. The closure member 82 has a stem 83 which passes through a larger diameter portion 84 of the stepped bore and is sealingly guided in a reduced diameter portion 85 of this bore. The stem 83 of the closure member 82 contains a longitudinal passage 86 which leads from a chamber 87 at the right hand end of the stepped bore to oblique passages in the closure member 82. These oblique passages have mouths so disposed in the conical face of the closure member 82 that they communicate with the pressure chamber 76 whatever the positions of the piston 74 and the closure member 82, i.e., they open at a diameter between the diameters of the valve seats 79 and 81. The bore portions 78 and 85 are of equal diameter so that the closure member 82 is hydrostatically balanced. The larger diameter bore portion 84 defines a valve chamber 88 connected to the inlet port 61. The longitudinal passage 80 in the piston stem 77 is connected by transverse bores to an annular groove 90 in the piston 74. This annular groove 90 communicates with the mouth of a passage 91 leading to the discharge port 66 at least when the valve seat 81 is separated from the valve closure member 82 as illustrated.

When the tractor brakes are not applied, the master cylinder does not develop any pressure so that there is no pressure in the control chamber 73. The pistons 72 and 74 are thus biased to their left hand end positions (illustrated) by a spring 92 housed in the pressure chamber 76. The closure member 82 is biassed against the seat 79 by a closure spring 93 housed in the valve chamber 88 and it will be seen that in the extreme leftward position of the piston 74 the valve seat 81 is spaced from the closure member 82 whereby the pressure chamber 76 is connected through the passage 80 the annular groove 90 and the passage 91 to the discharge port 66 leading through the line 67 to the reservoir 15. The hydraulic actuators 21 and 22 are thereby free of pressure when the control chamber 73 is not under pressure.

When the tractor brakes are applied, the master cylinder pressure is transmitted by the line 69 to the control chamber 73 and acts on the piston 72. Since the pressure chamber 76 is under reservoir pressure (normally atmospheric pressure or some other very low pressure) the pistons 72 and 74 are urged to the right against the spring 92. When the valve seat 81 engages the closure member 82 the pressure chamber 76 is isolated from the discharge port 66 and further movement of the pistons 72 and 74 to the right lifts the closure member 82 from the valve seat 79 thereby connecting the valve inlet chamber 88 to the pressure chamber 76. The closure member 82 co-operating with the seat 79 meters the flow of hydraulic fluid from the accumulator chamber 175 (FIG. 2) via the lines 26, 44, 62, 64 and 28 to the hydraulic actuators 21 and 22. As the pressure in the pressure chamber 76 rises and approaches the pressure in the control chamber 73 the pistons 74 and 72 are moved slightly leftwards again to substantially shut off the flow between the closure member 82 and the valve seat 79. Since the closure member 82 is hydrostatically balanced, the pressure in the pressure chamber 76 is maintained by the metering valve proportional to the pressure in the control chamber 73. The pressure applied to the hydraulic actuators 21 and 22 is thereby directly proportional to the pressure developed by the master cylinder. As the piston 74 is of only slightly larger diameter than the piston 72, the pressure in the chamber 76 is maintained at a value only slightly less than the pressure in the chamber 73. If desired, the piston 74 could be made of slightly lesser diameter than the piston 72 or both pistons could be made of the same diameter. The pistons 72 and 74 could be made integral with one another. When the brake is released, the pressure in the control chamber 73 falls to zero and the spring 92 urges the pistons 74 and 72 to their extreme leftward positions in which pressure chamber 76 is connected to the reservoir 15 thereby releasing the pressure from the hydraulic actuators.

In the case wherein the tractor is fitted with purely mechanical brakes and has no master cylinder, a load cell can be fitted in one of the links of the tractor brakes. The load cell may be a hydraulic load cell connected to the control chamber 73. Alternatively the load cell can be adapted to produce an electrical signal and for this purpose may comprise an electrical strain gauge connected to an electrical circuit adapted to develop an electrical signal whose magnitude is proportional to the applied brake force. In this case the metering valve 160 is a solenoid valve connected to receive this signal and adapted to adjust the pressure in the brake pressure chamber to correspond to the signal.

When so much hydraulic fluid has flowed from the accumulator chamber 175 (FIG. 2) that its pressure acting in the chamber 56 (FIG. 1) has fallen to a value at which the spring 50 can close the closure member 49 of the unloader valve 18, the accumulator 170 is again charged by the pump 10 in the previously described manner. Normally this lower pressure is still higher than the minimum pressure at which the piston 177 is urged away from the stop 179 and the spring 36 of the accumulator is fully compressed, as illustrated, with the abutment flange 94 on the piston 172 abutting the body member 171 and the trailer brakes fully relieved of their mechanically applied force. However, should the pressure in the hydraulic accumulator fall substantially below this lower value, e.g., due to a fracture in the accumulator line 44, 26, the spring 36 urges the sleeve 37 and the piston 172 to the left thereby pulling on the connecting rod 33 and the yoke 34 to apply the trailer brakes mechanically by the brake wires 35. Nevertheless sufficient hydraulic energy is normally retained in the accumulator to permit several brake actuations hydraulically, in the event of pump failure, before the brakes are applied mechanically. The number of such hydraulic actuations depends upon the size of the accumulator.

A lever 161 (FIG. 1) is pivoted to the body 70 of the metering valve 160 and acts on a plunger 162 which abuts the piston 72. The lever 161 can be used for applying the trailer brakes independently of the tractor brakes.

The dimensions of the hydraulic accumulator 170 (FIG. 2) including the force of its spring 36 and the initial pressure of the gas cushion in the chamber 176 are so chosen that the minimum pressure required in the accumulator chamber to completely overcome the spring 36 is approximately equal to the inital pressure in the chamber 176 at which the piston 177 rests against the stop 179. Thus during the initial charging of the accumulator 170 through the line 26, trailer brakes are mechanically relieved of the force of the spring 36 before the piston 177 commences to move to the left.

Although the mechanical actuator and the hydraulic actuators are shown as acting on the same brakes it may be convenient to provide separate brakes or at least separate brake shoes or pads for actuation by the hydraulic actuators and by the dual purpose accumulator.

A safety valve arrangement 100 is fitted in the trailer lines 26 and 28. This valve arrangement has a housing 101 containing passages 102 and 103 which connect the lines 26 and 28 to the coupling heads 27 and 29 respectively. The housing 101 also has a medial longitudinal bore 104 in which a plunger 105 is slideable. Transverse bores 108 and 109 intersect the passages 102 and 103. The inner ends of the transverse bores 108 and 109 are tapered to provide valve seats for balls (not shown) spring biased against these seats. The tapered inner ends of the bores 108 and 109 break into the longitudinal bore 104 and the balls protrude into this bore when they are seated. The plunger 105 has a shallow annular groove (not shown) normally registering with the balls to permit them to seat. When the plunger 105 is moved forwardly by means yet to be described the said balls are unseated and place the passages 102 and 103 in communication with one another through the bores 108 and 109 and an annular groove 113 in the plunger 105.

The forward free end of the plunger 105 is coupled by a chain 180 on a block 121 attached to the tractor vehicle.

The coupling heads 27, 29, 46 and 65 are of conventional construction and can be separated by a firm pull without damage in the event that the trailer breaks away from the tractor. Each of the coupling heads is provided with a self-closing valve whose movable valve closure members 127, 128 is held open by abutment with the valve member 128, 127 in the complementary head when the heads 27 and 29 are fitted to their corresponding heads 46 and 65 and is automatically closed by springs when the coupling heads are pulled apart.

The safety valve arrangement 100 and the coupling heads 27, 29, 46 and 65 are described more fully in our co-pending Pat. application Ser. No. 795,085 filed Jan. 29, 1969, now U.S. Pat. No. 3,526,438.

Should the trailer break away from the tractor vehicle, the coupling heads 27 and 29 are pulled away from the heads 46 and 65 respectively. When the heads are separated, the valve springs urge the valve closure members 127 and 128 against their seats in the coupling heads to close off the coupling heads. At the same time the tractor pulls on the plunger 15 and the plunger 105 opens the ball valves to connect the accumulator line 26 to the brake line 28. The hydraulic accumulator 170 thereby automatically operates the trailer brake actuators 21 and 22 in the event of a trailer break-away. Finally the chain 180 breaks to permit complete separation of the plunger 105 from the block 121.

The lines 26 and 28 or the lines 44 and 64 will normally include a flexible hose portion. Should the line 26 or the line 44 and in particular the flexible hose portion thereof be fractured, there will be an immediate loss of pressure from the pressure accumulator 170 which will result in the spring 36 applying the trailer brakes mechanically thereby warning the driver that a fracture has occurred. Should the line 28 or the line 64 fracture then the driver may not notice the fracture until he applies the brakes. However, once he applies the brakes and pressure is developed in the control chamber 73 of the metering valve, the fracture prevents a corresponding pressure from being developed in the brake pressure chamber 76. Consequently, the closure member 82 is fully opened and the hydraulic fluid is immediately discharged from the hydraulic accumulator through the fracture and the consequent loss in pressure in the hydraulic accumulator permits the spring 36 to apply the trailer brakes mechanically.

Figure 3:
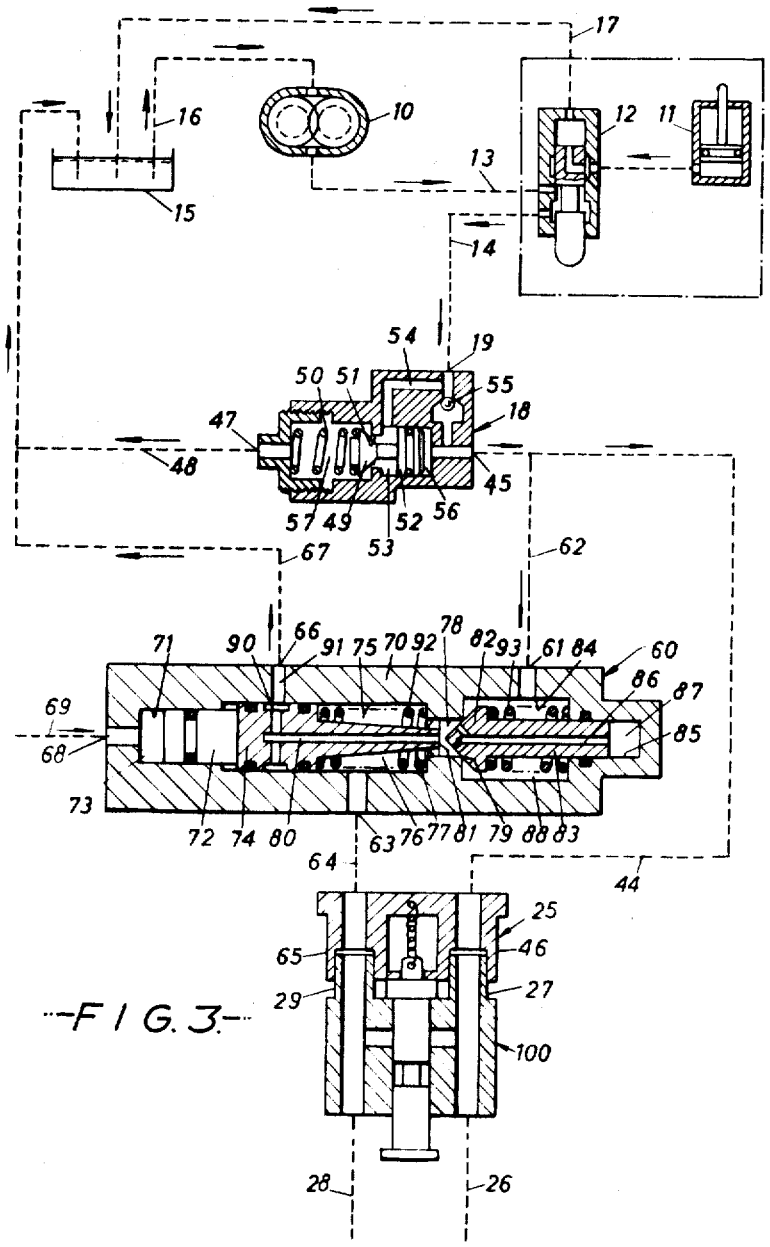
FIGS. 3 and 4 are views similar to FIGS. 1 and 2, respectively, of a second embodiment of vehicle braking system.
Figure 4:
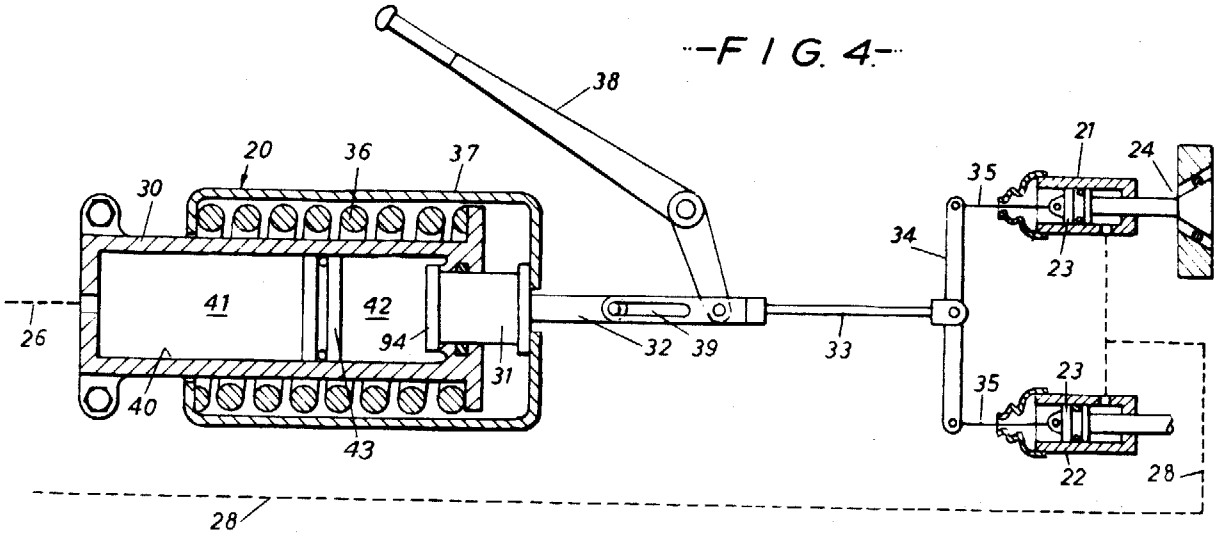

FIGS. 3 and 4 show another embodiment of the trailer brake system. In FIGS. 3 and 4, parts like those of FIGS. 1 and 2 are denoted by like reference numerals and will not be described again. FIG. 3 differs from FIG. 1 principally in that the metering valve 60 is not provided with means 161, 162 for applying the trailer brakes independently of the tractor brakes. For simplicity the closure members in coupling heads 27, 29, 46 and 65 are not shown in FIG. 3.

The hydraulic accumulator 20 shown in FIG. 4 differs from the accumulator 170 of FIG. 2 in that a cylindrical cavity 40 in the fixed body 30 of the accumulator 20 is divided by a free piston 43 into chambers 41 and 42 of which the left hand chamber 41 is connected to the line 26 and serves to store the hydraulic fluid while the right hand chamber 42 is charged with gas under a suitable pressure to provide a gas cushion. Thus a piston 31, which is slidable in the right hand end of the body 30 and which acts on the piston rod 32 and is abutted by the sleeve 37, is exposed to the gas chamber 42 rather than the chamber 175 (FIG. 2) for the hydraulic fluid. The gas cushion could be replaced by a spring acting between the piston 43 and the piston 31.

The accumulator 20 is shown in FIG. 4 in its charged condition but initially the piston 31 is in its leftward position and the piston 43 is in its extreme leftward position. When the pressure of the hydraulic fluid exceeds the pressure to which the gas cushion in the chamber 42 is initially charged the piston 43 moves to the right and balances the pressures in the chambers 41 and 42. As the size of the chamber 41 increases the gas cushion is further compressed and when the force of this pressure acting on the piston 31 becomes as large as the initial force in the spring 36 the piston 31 is moved to the right thereby simultaneously relieving the trailer brakes of the mechanically applied force.

Normal operation of the braking system of FIGS 3 and 4 is substantially as previously described with reference to FIGS. 1 and 2.

When so much hydraulic fluid has flowed from the accumulator chamber 41 that its pressure acting in the chamber 56 (FIG. 3) has fallen to a value at which the spring 50 can close the closure member 49 of the unloader valve 18, the accumulator 20 is again charged by the pump 10. Normally this lower pressure is still higher than the minimum pressure at which the spring 36 of the accumulator is fully compressed, as illustrated, with the abutment flange 94 on the piston 31 abutting the body member 30 and the trailer brakes fully relieved of their mechanically applied force. However, should the pressure in the hydraulic accumulator fall below this lower value, e.g., due to a fracture in the accumulator line 44, 26, the spring 36 urges the sleeve 37 and the piston 31 to the left thereby applying the trailer brakes mechanically. Initially, with the accumulator completely discharged, i.e., with the piston 43 fully to the left, the gas pressure in the chamber 42 acting on the piston 31 is insufficient to overcome the initial stress in the spring 36. When the chamber 41 has been filled to approximately one-third of its fully charged volume the pressure has been sufficiently increased to completely overcome the spring 36 and completely relieve the trailer brakes of the mechanically applied braking force.

As an alternative, the force of the spring 50 of the unloader valve 18 (FIG. 3) and the dimensions of the hydraulic accumulator 20 (FIG. 4) including the force of its spring 36 and the initial pressure of the gas cushion in the chamber 42 may be so chosen in relation to the quantity of hydraulic fluid consumed by the actuators 21 and 22 upon a single actuation of the brake by actuation of the master cylinder that the pressure in the accumulator falls below the pressure at which the spring brakes mechanically. In this way the trailer brakes may be applied simultaneously and hydraulically.

We claim:

1. A vehicle braking system comprising, in combination, a dual purpose hydraulic accumulator adapted to store hydraulic fluid under pressure and provided with a brake spring adapted to mechanically apply brakes of the vehicle, said brake spring being compressed to relieve said brakes of said mechanical actuation when hydraulic fluid is stored in said accumulator; a vehicle brake mechanism; hydraulic actuator means for operating said brake mechanism; and a metering valve for controllably connecting said hydraulic accumulator to said hydraulic actuator means for normal operation of the braking system.

2. A vehicle braking system according to claim 1 further comprising safety valve means for connecting said hydraulic accumulator directly to said hydraulic actuator means, independently of said metering valve, for emergency operation of the braking system.

3. A braking system according to claim 1 for a trailer vehicle adapted to be hitched to a tractor vehicle in which said metering valve is fitted to the tractor vehicle and said dual purposes hydraulic accumulator, said brake mechanism and said actuator means are fitted to the trailer vehicle, said metering valve having a housing with an inlet port, a brake port and a drain port and containing valve means adapted to selectively and controllably connect said brake port to said drain port or said inlet port, and in which said braking system includes a brake line on said trailer vehicle and connected to said actuator means, first cooperating coupling means for releasably connecting said brake port to said brake line, an accumulator line on said trailer vehicle and connected to said accumulator and second cooperating coupling means for releasably connecting said accumulator line to said metering valve inlet port.

4. A braking system according to claim 3 in which said first and second cooperating coupling means include trailer mounted coupling heads to which said brake and accumulator lines are attached respectively, tractor-mounted couplng heads respectively cooperable therewith and closure members at least in said trailer-mounted coupling heads and adapted to automatically seal off said trailer-mounted coupling heads when the latter are detached from the tractor-mounted coupling heads and in which the braking system further includes a safety valve arrangement on the trailer vehicle and adapted to interconnect said accumulator and brake lines in the event that the trailer vehicle breaks away from the tractor vehicle.

5. A braking system according to claim 3 in which said valve means of said metering valve is adapted to control connections between said inlet port and said brake port and between said brake port and said drain port, and in which said metering valve further comprises a brake pressure chamber in said housing connected to said brake port, a control chamber in said housing adapted to be subjected to a control pressure and valve actuating means responsive to the difference between the fluid pressures in said brake pressure chamber and said control chamber for actuating said valve means.

6. A braking system according to claim 5 in which said valve actuating means comprises piston means slidable in said housing and in which said valve means comprises a first valve seat disposed in said housing between said inlet and brake supports thereof, a second valve seat on said piston means, and a valve closure member cooperable with said first and second valve seats, said second valve seat being connected to said drain port at least when said second seat is spaced from said closure member, said piston means being movable by pressure in said control chamber until said second valve seat engages said closure member, further movement of said piston means lifting said closure member from said first seat to establish communication between said inlet and brake ports.

7. A braking system according to claim 1 in which said brake spring acts on said brake mechanism in a direction to mechanically operate said mechanism.

8. A vehicle braking system according to claim 1 further comprising a constant volume hydraulic pump having a pump outlet; hydraulic services adapted to consume hydraulic power; at leasat one open-center type control valve having an inlet port, a service port and a drain port, said service port being connected to said hydraulic services; and an unloader valve having an inlet port, a pressure port and a drain port, said pressure port being connected to said accumulator, said control valve and said unloader valve being connected in series by their said inlet and drain ports to form a series circuit, said series circuit being connected to said pump outlet, said control valve being adapted to control said hydraulic services and said unloader valve being adapted to load said pump to enable the pump to charge said accumulator and being adapted to switch to a pump unloading state when the accumulator has been charged to a predetermined pressure.

9. A vehicle braking system according to claim 1 further comprising a hydraulic pump having a pump outlet; an unloader valve having an inlet port, a pressure port, a drain port, a valve seat between said inlet port and said drain port and valve closure member cooperating with said valve seat and movable away from said valve seat responsively to a predetermined pressure applied to said pressure port; means connecting said pump outlet to said inlet port; means connecting said pressure port to said accumulator and means interconnecting said inlet port and said pressure port for charging said accumulator to said predetermined pressure whereupon said valve closure member opens said valve seat to connect said inlet port to said drain port to unload said pump.

10. A braking system for a trailer vehicle adapted to be hitched to a tractor vehicle comprising a trailer brake mechanism; hydraulic actuator means on said trailer vehicle for operating said trailer brake mechanism; a hydraulic accumulator on said trailer vehicle for storing hydraulic fluid under pressure; a hydraulic pump on said tractor vehicle, said pump having a pump outlet; an unloader valve on said tractor vehicle, said unloader valve having an inlet port, a pressure port, a drain port, a valve seat between said inlet port and said drain port and a valve closure member cooperating with said valve seat and movable away from said valve seat responsively to a predetermined pressure applied to said pressure port; means connecting said pump outlet to said unloader valve inlet port; means connecting said pressure port to said accumulator; means interconnecting said unloader valve inlet port and said pressure port for charging said accumulator to said predetermined pressure whereupon said valve closure member opens said valve seat to connect said unloader valve inlet port to said unloader valve drain port to unload said pump; a metering valve on said tractor vehicle for controllably connecting said hydraulic accumulator to said hydraulic actuator means for normal operation of the braking system, said metering valve having an inlet port, a brake port and a drain port and being adapted to selectively and controllably connect said brake port to said metering valve drain port or said metering valve inlet port; a brake line on said trailer vehicle and connected to said actuator means; first cooperating coupling means for releasably connecting said brake port to said brake line; an accumulator line on said trailer vehicle and connected to said accumulator; and second cooperating coupling means for releasably connecting said accumulator line to said unloader valve pressure port and to said metering valve inlet port.

11. A braking system according to claim 10 in which said first and second cooperating coupling means include trailer mounted coupling heads to which said brake and accumulator lines are attached respectively, tractor-mounted coupling heads respectively cooperable, therewith and closure members at least in said trailer-mounted coupling heads and adapted to automatically seal off said trailer-mounted coupling heads when the latter are detached from the tractor-mounted coupling heads and in which the braking system includes a safety valve arrangement on the trailer vehicle and adapted to interconnect said accumulator and brake lines in the event that the trailer vehicle breaks away from the tractor vehicle.

12. A vehicle braking system comprising a vehicle brake mechanism; hydraulic actuator means for operating said brake mechanism; a dual purpose hydraulic accumulator for storing hydraulic fluid under pressure; said hydraulic accumulator including a brake spring adapted to mechanically apply brakes of the vehicle said brake spring being compressed to relieve said brakes of said mechanical actuation when hydraulic fluid is stored in said accumulator; a hydraulic pump having a pump outlet; an unloader valve having an inlet port, a pressure port, a drain port, a valve seat between said inlet port and said drain port and a valve closure member cooperating with said valve seat and movable away from said valve seat responsively to a predetermined pressure applied to said pressure port; means connecting said pump outlet to said inlet port; means connecting said pressure port to said accumulator; means interconnecting said inlet port and said pressure port for charging said accumulator to said predetermined pressure whereupon said valve closure member opens said valve seat to connect said inlet port to said drain port to unload said pump; an emergency valve controlling a connection between said accumulator and said hydraulic actuator means; and means for actuating said emergency valve.

References Cited

The following references, cited by the Examiner, are of record in the patented file of this patent or the original patent.

UNITED STATES PATENTS

| | | | |
|---|---|---|---|
| 3,110,522 | 11/1963 | Bunch | 303—9 |
| 3,114,580 | 12/1963 | MacDuff | 303—9 |

DUANE A. REGER, Primary Examiner

D. C. BUTLER, Assistant Examiner

U.S. Cl. X.R.

303—9, 10; 188—3, 106 P, 170; 138—31; 92—134